Figure 1:
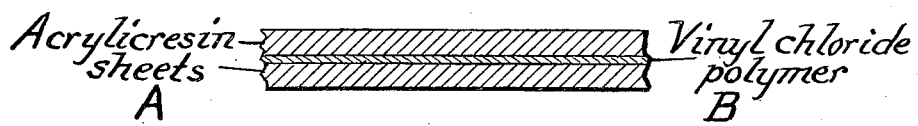

June 29, 1948.   H. T. NEHER ET AL   2,444,059
LAMINATED PLASTIC MATERIAL
Filed Dec. 30, 1943

INVENTORS
Harry T. Neher &
La Verne N. Bauer
BY John F. Bergin
ATTORNEY.

Patented June 29, 1948

2,444,059

UNITED STATES PATENT OFFICE 2,444,059

LAMINATED PLASTIC MATERIAL

Harry T. Neher, Bristol, and La Verne N. Bauer, Philadelphia, Pa., assignors to Rohm & Haas Company, Philadelphia, Pa., a corporation of Delaware Application December 30, 1943, Serial No. 516,177

8 Claims. (Cl. 154—43)

This invention relates to laminated plastic sheets having marked resistance to shattering. More particularly, it relates to transparent laminated sheets of acrylic resin which are bonded together by a transparent, flexible interlayer of plasticized vinyl chloride polymer.

Acrylic resin finds wide applications in the form of rigid, transparent sheets for enclosures, particularly in aircraft where such sheets are of especial advantage because of low density, optical clarity, absence of color, and the ease with which flat sheets are formed into curved shapes. Acrylic sheets are highly useful in military aircraft, in which they exhibit satisfactory resistance to shattering under gun-fire over a wide range of temperatures, provided there is no pressure differential on the two sides of the sheet.

While in aircraft intended for low altitude flying, there is no need for a pressure differential, for so-called stratosphere or sub-stratosphere flying pressures become desirable within the enclosures of aircraft intended for this purpose. The recent trend towards pressurized cabins and turrets for flying at high altitudes has brought about changes in the requirements for transparent sheets and forms. It is important that a pressurized enclosure remain as intact as possible when damaged, as by gun-fire, to prevent rapid loss of pressure within such enclosure and to permit ready repair or plugging of a hole during flight. It is, therefore, important that transparent acrylic sheets or forms resist shattering when pierced, as by a bullet. While the resistance to shattering of single acrylic sheets under a pressure differential has not been altogether satisfactory, it is yet desired to retain the many advantages of acrylic resins for use in pressurized enclosures.

It has been found by the applicants that the shattering tendency of sheets of acrylic resin can be overcome by joining two or more sheets of such material with a flexible, transparent interlayer which is made to adhere tightly to the sheets. This strong adhesion must persist from temperatures as low as −70° F. up to 150° F. The interlayer and sheets attached thereto must remain free from shattering tendencies over this same temperature range, must not allow a cone of resin particles to fly when a hole is made, as by a flying projectile, and must retain transparency and freedom from color under exposure to strong actinic rays for prolonged periods. At the same time, the laminated structure must be capable of preparation without substantial loss of the desirable optical properties characteristic of acrylic resins. The laminated sheets should still be capable of being bent and shaped with retention of the above properties.

These requirements, it has been found, are met by but few constructions, and these could not have been predicted from the prior art in allied fields. Many kinds of materials successfully used as interlayers with silicate glass lack the required properties, such as the degree of adhesion necessary when laminated acrylic resin sheets are used, or fail to have the required properties over the necessary range of temperature.

It has also been found by applicants that a suitable laminated structure meeting the stringent requirements set forth above may be prepared by joining under heat and pressure a plurality of sheets of acrylic resin with a plasticized interlayer, between each pair of sheets, of polymerized vinyl chloride or a copolymer of vinyl chloride and another polymerizable ethenoid derivative or a compatible mixture of polymerized vinyl chloride and another polymerized ethenoid derivative, such copolymers and mixtures of polymers having a vinyl chloride content of at least fifty per cent. These polymeric materials adhere directly to the acrylic resin to form a strong, transparent laminate which resists shattering and which possesses the properties required for the most exacting use and retains them under severe conditions of exposure.

Figure 2:
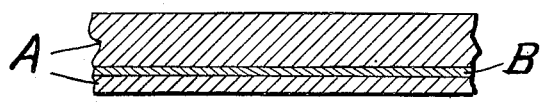
Figure 3:
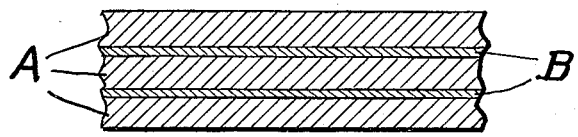
Figure 4:
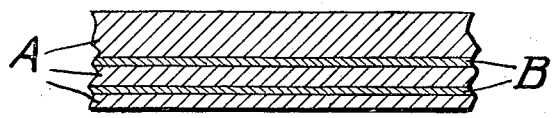
Figure 5:
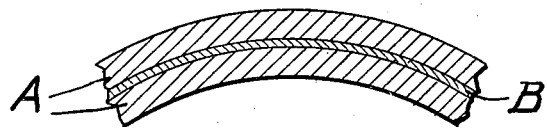

Figures 1 through 5 show cross-sectional views of various embodiments of this invention. In the drawing, A represents the layers of acrylic resin and B, the interlayer of vinyl chloride polymer. In Figure 1, two acrylic resin sheets of equal thickness are bonded by their own adhesion to a thin interlayer of a vinyl chloride polymer. In Figure 2, the layers of acrylic resin are of different thickness. Figures 3 and 4 are illustrative of the bonding of more than two sheets of acrylic resin with interlayers of vinyl chloride polymer. Figure 5 represents shaped acrylic resin sheets bonded together with a vinyl chloride polymer.

Acrylic resin sheets are those containing principally a polymerized lower alkyl ester of methacrylic acid, such as methyl methacrylate, ethyl methacrylate, isopropyl methacrylate, or isobutyl methacrylate. There may also be used copolymers from a lower alkyl ester of methacrylic acid or mixture of such esters in preponderant amount and a minor amount of another organic polymerizable unsaturated compound which is compatible therewith, such as an alkyl ester of acrylic acid like ethyl acrylate, butyl acrylate, or other polymerizable ethenoid compound, such as octyl methacrylate, styrene, or vinyl acetate. Sheets suitable for use in this invention are available commercially under the trade names of "Lucite" and "Plexiglas." These sheets are essentially polymerized methyl methacrylate.

Polymers of vinyl chloride which are suitable as the interlayer have been found to be those in which at least 50% of the polymer is based on vinyl chloride. The preferred polymers have a vinyl chloride content of 80% to about 95%. Especially suitable are copolymers of vinyl chloride with 5% to 20% of vinyl esters of the lower fatty acids, such as, for example, vinyl acetate, or of lower alkyl acrylic acid esters (e. g., methyl acrylate), or of lower alkyl maleic acid esters (e. g., dimethyl maleate). These are typical of various polymerizable, resin-forming ethenoid compounds which are compatible with vinyl chloride and form copolymers therewith.

The polymers are plasticized with any high-boiling compound soluble or compatible therewith or mixture of such compounds. The preferred plasticizers are those which are compatible with the vinyl polymer and have but a limited or incomplete compatibility with acrylic resins, for plasticizers of this preferred type are well retained by the vinyl layer and do not tend to migrate into the acrylic sheets. Especially valuable plasticizers are di-(ethoxyethyl) phthalate, dioctyl phthalate, dibutyl phthalate, butyl phthalyl butyl glycolate, and similar multi-functional, high-boiling liquids. Other suitable plasticizers include butyl capryl phthalate, dibutyl sebacate, dibenzyl sebacate, methyl ethyl phthalyl glycolate, tetrahydrofurfuryl sebacate, maleyl di-(butyl lactate), alkoxy alkyl esters of long chained fatty acids, such as methoxy ethyl oleate, triethylene glycol di(2-ethyl butyrate), tri-p-tert.-butyl phenyl phosphate, tricresyl phosphate, benzyl benzoate, butyl cyclohexyl phthalate, $\beta$-naphthyl ethyl ether, ethylene glycol dibenzoate, dibutyl tartrate, isophorone, methyl hexyl ketone, and other similar compounds.

Mixtures of plasticizers are often of considerable value. For example, it has been found that mixtures often overcome any tendency of the polyvinyl chloride interlayer to become hazy at low temperatures. Thus, 10% to 15% of methyl hexyl ketone added to a vinyl chloride polymer plasticized with dibutyl sebacate which tended to yield a hazy film below 0° F. greatly improved the clarity of the film, even at very low temperatures.

Sufficient plasticizer must be incorporated with the vinyl chloride polymer to maintain flexibility at the lowest temperature required for a particular application. The actual amount will obviously vary, not only with the application but also with the particular plasticizer or combination of plasticizers and the particular copolymer selected.

As a specific example of the effect of plasticizers, there is here cited the effect on the softening point of a copolymer from 90 parts of vinyl chloride and 10 parts of vinyl acetate with various percentages of a plasticizer consisting of equal parts by weight of di(ethoxyethyl) phthalate and of dibutyl phthalate.

TABLE

*Softening temperatures with various amounts of plasticizers*

| Per cent Plasticizer | Softening Point |
| --- | --- |
| 60 | −50° C. (−58° F.) |
| 55 | −40° C. |
| 50 | −32° C. |
| 42 | −16° C. |
| 38 | −7° C. |
| 33 | +8° C. (+46° F.) |

In general, there may be used from about 30% to about 65% of a plasticizer or mixture of plasticizers (on the basis of the total weight of the composite mixture forming the interlayer) to produce a film of a vinyl chloride polymer having the requisite degree of toughness, clarity, flexibility, and adhesion to acrylic resin sheets over the required temperature range. The amount of plasticizer which is to be used may readily be determined from the point at which a plasticized sheet of vinyl chloride polymer becomes flexible. In general, it is preferred to use plasticizer in an amount sufficient to maintain the interlayer in a flexible state below 0° C.

It is of interest to note in this connection that where the pressurized enclosures are heated, it is not necessary to plasticize the vinyl chloride polymer interlayer to retain an extreme flexibility at the lowest temperatures to be encountered. This is particularly true in the case of laminates constructed with acrylic sheets having different thicknesses, the thinner acrylic sheet being at the inner surface.

In addition to the plasticizer added to the polymeric vinyl resin, there may be incorporated therewith one or more stabilizers for preventing or minimizing changes in this resin as a result of exposure to heat and/or light, including such agents as metal soaps of fatty acids, urea, triethanolamine, phenyl thiourea, or similar nitrogen compound. Methallyl alcohol and esters of salicylic acid have been found good light stabilizers and pinene or alkali carbonates good heat stabilizers. There are many other light and heat stabilizers known to the art.

To prepare laminates of acrylic resin sheets in accordance with this invention, sheets of plasticized vinyl chloride polymer (which term includes not only polyvinyl chloride resin itself but also the copolymers and the mixtures of polymers which are predominantly composed of vinyl chloride) are placed between sheets of acrylic resin and the resulting assembly pressed together. The assembly is made into a coherent laminate by heating, desirably under pressure, until the acrylic resin is firmly adhered to the vinyl chloride resin. Temperatures of 65° C. to 135° C. are generally suitable, the optimum temperature depending upon the particular polymer used and the kind and amount of plasticizer employed. It is generally desirable to keep time and temperature at minimum values to avoid the well known thermal effects on the stability of vinyl resins. For interleafing acrylic sheets, there may be used sheets of vinyl chloride polymer in thickness from about 0.005″ upwards, preferably 0.01″ to 0.3″. It will be evident that the thickness selected will be somewhat in proportion to the thickness of the acrylic sheets to be laminated, yet a minimum thickness of interleaf is desired to impart the necessary strength to the plasticized interlayer.

The invention is illustrated by the following examples:

EXAMPLE 1

Four hundred parts of a copolymer of vinyl chloride and vinyl acetate, in the ratio of 9:1, was milled at 105°–115° C. with 280 parts of di(ethoxyethyl) phthalate, 280 parts of dibutyl phthalate, 30 parts of pinene, and 10 parts of methyl salicylate. The composite of several batches was calendered on rolls to large sheets and press-polished between sheets of Cellophane to yield flexible plasticized sheets (24″ x 54″), which were then cut into pieces of 0.225″ x 20″ x 22″. It will be noted these sheets contained 60% of plasticizers.

By the same procedure flexible plasticized sheets, 0.06″ x 20″ x 22″ in dimensions, were made by milling 700 parts of the same copolymer with 130 parts of di(ethoxyethyl) phthalate, 130 parts of dibutyl phthalate, 30 parts of pinene, and 10 parts of methyl salicylate. It will be noted these sheets contained 30% of plasticizers.

The Cellophane was removed from the flexible plasticized sheets and an assembly was made, possessing five plys in all, by pressing the plasticized sheets of vinyl chloride polymer between sheets of polymerized methyl methacrylate which had been heated in an oven at 125° C. for three minutes. The assembly was made up as follows:

Acrylic sheet, 0.250" x 20" x 22"
Vinyl copolymer sheet, 30% plasticized, 0.06" x 20" x 22"
Acrylic sheet, 0.06" x 20" x 22"
Vinyl copolymer sheet, 60% plasticized, 0.225" x 20" x 22"
Acrylic sheet, 0.06" x 20" x 22"

The five-ply assembly was held rigidly in a frame and autoclaved in a white oil bath at 115° C. under a nitrogen pressure of 150 pounds per square inch for two hours. It was cooled to 30° C. while still under pressure to give a laminated structure, which was then formed into a section of a truncated cone by heating in an air oven at 125° C. for twenty minutes and shaping about a form. The truncated cone section (18" x 20") was cooled to −25° C. and clamped quickly into a large pressure chamber so that a window was formed, 16" x 18" free area. The thicker (0.250") acrylic sheet comprised the outside of the pressure chamber. A pressure of eight pounds per square inch was then applied to the chamber and an armor-piercing .50 caliber machine gun bullet was fired into the laminated window. It showed excellent performance with a definite tendency to be self-sealing. There was practicaly no spalling of the inside sheet of acrylic resin, 0.06" thick, inside the chamber and away from the muzzle of the rifle.

Other laminates were prepared and tested in the same way. Equally good performance was exhibited at +20° C.

EXAMPLE 2

Acrylic resin sheets, obtained commercially as "Plexiglas," were cut into pieces of sizes convenient for handling (0.375" x 20" x 22" and 0.060" x 20" x 22"). A commercial vinyl chloride polymer containing 50% of plasticizers, obtainable commercially as "Vinylite VYNS," was prepared in the form of sheets having dimensions of 0.075" x 20" x 22". Assemblies were prepared from a piece of acrylic resin sheet having a thickness of 0.060", a piece of the vinyl resin 0.075" thick, and a piece of acrylic resin sheet 0.375" thick. The assembly was heated to 125° C. and passed between squeeze rolls. The assembly was then heated at 115° C. under mineral oil under a pressure of 150 pounds per square inch for two hours.

The laminated structure was then shaped into a section of a truncated cone and tested at 20° C. under an air pressure of eight pounds per square inch by firing a bullet through the structure from a .50 caliber rifle. The thicker acrylic resin sheet, which formed the outer surface of the test piece, had a hole of 0.5 inch in diameter with spalling to a diameter of 1.5 inches. The acrylic sheet of 0.06" thickness inside of the chamber also had a hole 0.5 inch in diameter but with spalling to a diameter of only 0.95 inch. The hole in the interleaf of vinyl resin was 0.5 inch also, but there were no tears in this layer. A few cracks developed in the acrylic resin sheets radiating out from the hole, but in only one case were cracks coincident in the inner and outer acrylic resin sheets. This result is regarded as excellent, particularly as the hole could be readily plugged.

EXAMPLE 3

A sheet of polymeric methyl methacrylate 0.187 inch thick was laminated to a second polymeric acrylic resin sheet 0.125 inch thick with a sheet of polymeric vinyl resin of 95% vinyl chloride content plasticized to the extent of 60% in a thickness of about 0.07 inch. The three sheets were pressed together and then subjected to autoclave treatment at 119° C. under 150 pounds per square inch pressure for three-fourths of an hour. The resulting laminate had excellent clarity even after being chilled to −78.5° C. (−109.3° F.).

A 12-inch disc was cut from the laminate and stored in dry ice for four hours. It was then clamped in the face of a pressure chamber to which eight pounds per square inch air pressure was applied. Two 0.30–.30 caliber hard-nose bullets were fired through the chilled disc.

The holes in the outer acrylic resin sheet of 0.187" thickness were 0.312" in diameter, the holes in the film varied from 0.5" to 0.6" across, and the holes in the inner sheet were 0.75" in diameter. There were a few slight cracks about the holes, but the disc remained otherwise essentially intact. The performance of this chilled piece was very good.

A section of this laminate was stored in the ice compartment of an electric refrigerator for one year. Excellent clarity was retained.

Another section was exposed to Philadelphia weather for one year. It showed good light stability and the lamination remained intact, although the exposed edge of the interleaving film was somewhat weathered.

By heating an assembly of a plurality of acrylic resin sheets interleaved with sheets of polymerized vinyl chloride, plasticized to the extent of 30% to 65% of the weight of the composite mixture, there is obtained a laminated sheet which possesses the inherent advantages of acrylic resin sheets together with the advantages of such a laminated structure. The particular combination described bonds layers of acrylic resin with great tenacity. The composite sheet remains clear and free from milky strata or cloudiness even at low temperatures. The structure while apparently rigid still possesses the degree of flexibility required for successful use in windows or other enclosures, particularly in aircraft. The laminates can still be shaped and the optical clarity and freedom from distortion retained. The shaping can be accomplished by known and accepted methods for handling and forming thermoplastic sheets into curved surfaces, such as domes, windshields, turrets, etc. The laminated structures of this invention are not shattered when pierced even when under a pressure differential. They do not yield a cone of flying particles when pierced. The holes may for these reasons be plugged or repaired with ease and certainty. The laminates of this invention permit bonding of the multi-ply structure of acrylic resin sheets to other materials, such as glass or metal, although the vinyl resin sheet by itself may require the use of special cements to secure adequate adhesion to silicate surfaces. This is one of the peculiar differences over the prior art.

A particular and peculiar advantage of the laminates of this invention resides in the fact that in the joining of sheets of acrylic resin to each other, special adhesives are not required.

For this reason, danger from bubble formation is practically eliminated. Also, the danger of attacking the sheets with solvents and thereby causing distortions is avoided.

We claim:

1. A laminated structure comprising a plurality of rigid sheets of acrylic resin bonded together and interleafed with a polymeric material having a vinyl chloride content of at least 50%, said polymeric material being plasticized with from 30% to 65% by weight of the resulting composite mixture of a plasticizer.

2. A laminated structure comprising two rigid sheets of acrylic resin bonded together and interleafed with a polymeric material having a vinyl chloride content of at least 50%, said polymeric material being plasticized with from 30% to 65% by weight of the resulting composite mixture of a plasticizer.

3. A laminated structure comprising a plurality of rigid sheets of polymethyl methacrylate bonded together and interleafed with a polymeric material having a vinyl chloride content of at least 50%, said polymeric material being plasticized with from 30% to 65% by weight of the resulting composite mixture of a plasticizer.

4. A laminated structure comprising two rigid sheets of polymerized methyl methacrylate bonded together and interleafed with a polymeric material having a vinyl chloride content of at least 50%, said polymeric material being plasticized with from 30% to 65% by weight of the resulting composite mixture of a plasticizer.

5. A laminated structure resistant to shattering, particularly when pierced while under a pressure difference on the faces thereof, which comprises at least two sheets of rigid acrylic resin bonded together with a tough, flexible interlayer of polymeric material having a vinyl chloride content of at least 50%, plasticized with from 30% to 65% by weight of the resulting composite mixture of a plasticizer.

6. A laminated structure resistant to shattering, particularly when pierced while under a pressure difference on the faces thereof, which comprises at least two sheets of rigid acrylic resin bonded together with a tough, flexible interlayer comprising a copolymer having a vinyl chloride content of at least 50% copolymerized with another polymerizable ethenoid compound, plasticized with from 30% to 65% by weight of the resulting composite mixture of a plasticizer.

7. A laminated structure resistant to shattering, particularly when pierced while under a pressure difference on the faces thereof, which comprises at least two sheets of rigid acrylic resin bonded together with a tough, flexible interlayer comprising a copolymer having a vinyl chloride content of at least 50% copolymerized with vinyl acetate, plasticized with from 30% to 65% by weight of the resulting composite mixture of a plasticizer.

8. A laminated structure resistant to shattering, particularly when pierced while under a pressure difference on the faces thereof, which comprises at least two sheets of polymerized methyl methacrylate resin bonded together with polymeric vinyl chloride plasticized with from 30% to 65% by weight of the resulting composite mixture of a plasticizer.

HARRY T. NEHER.
LA VERNE N. BAUER.

REFERENCES CITED

The following references are of record in the file of this patent:

UNITED STATES PATENTS

| Number | Name | Date |
|---|---|---|
| 2,042,485 | Ryan et al. | June 2, 1936 |
| 2,135,075 | Herrmann | Nov. 1, 1938 |
| 2,142,279 | Menger | Jan. 3, 1939 |

FOREIGN PATENTS

| Number | Country | Date |
|---|---|---|
| 157,688 | Austria | Jan. 10, 1940 |